(No Model.)
P. KREBS.
BICYCLE BRAKE.
No. 604,587.　　　　　　　　Patented May 24, 1898.
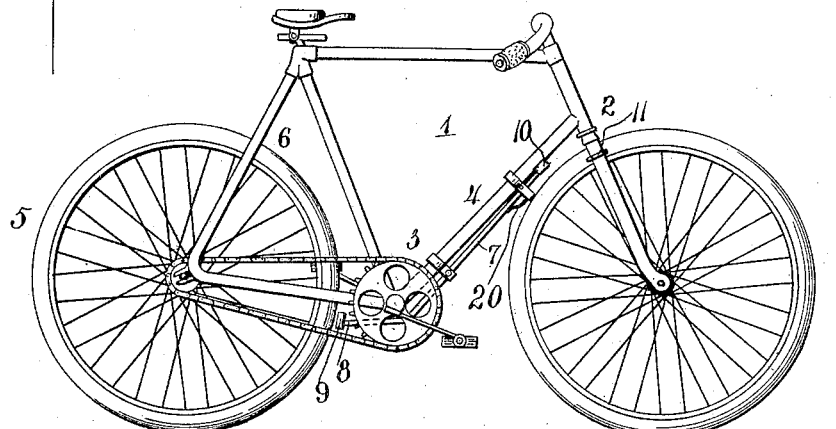
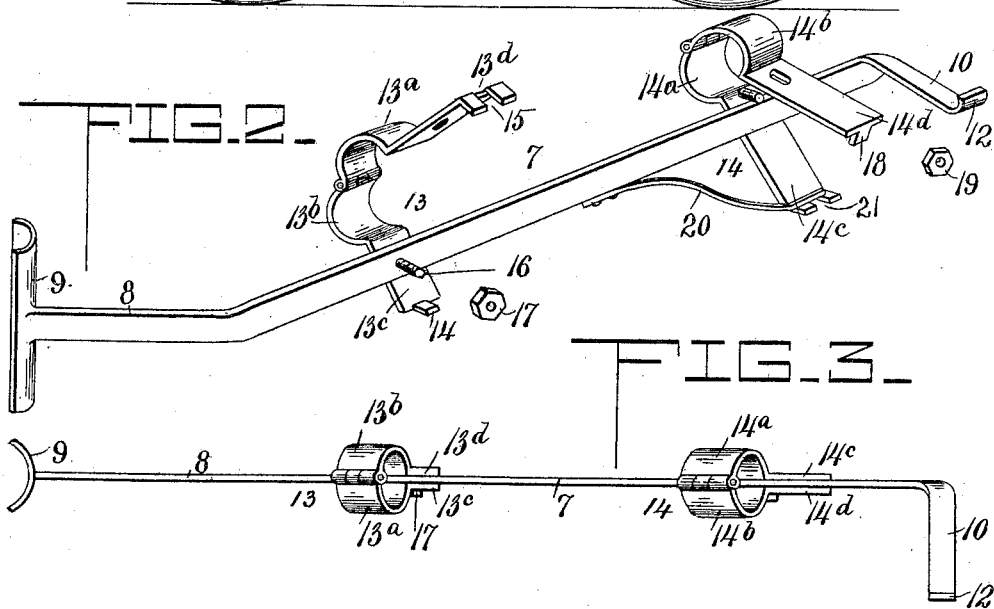
Witnesses
W. G. Allen
Victor J. Evans
Inventor
Peter Krebs.
By John Wedderburn.
Attorney

UNITED STATES PATENT OFFICE.

PETER KREBS, OF SHAWNEE, OHIO.

BICYCLE-BRAKE.

SPECIFICATION forming part of Letters Patent No. 604,587, dated May 24, 1898.

Application filed May 26, 1897. Serial No. 638,302. (No model.)

*To all whom it may concern:*

Be it known that I, PETER KREBS, of Shawnee, in the county of Perry and State of Ohio, have invented certain new and useful Improvements in Bicycle Foot-Brakes; and I do hereby declare the following to be a full, clear, and exact description of the invention, such as will enable others skilled in the art to which it appertains to make and use the same.

My invention relates to improvements in foot-brakes for bicycles, the object being to provide improved brake mechanism adapted to be operated at a point adjacent the foot-rests on the front fork, whereby the bicycle may be under the complete control of the rider, especially when coasting.

With this and other objects in view the invention consists in the novel constructions and combinations of parts hereinafter more fully described, and specifically set forth in the appended claim.

In the accompanying drawings, illustrating the invention, Figure 1 is a side elevational view of a bicycle embodying my invention. Fig. 2 is an enlarged detail perspective view of the brake mechanism removed, and Fig. 3 is a top plan view of the same.

Referring now more particularly to the drawings, the numeral 1 designates the frame of a bicycle of the safety type; 2, the front fork; 3, the crank-hanger thereof, and 4 the reach-bar or tube extending from the said crank-hanger to the forks.

5 is a rear wheel mounted between the rear-fork rods 6.

My invention consists in a brake-lever 7, extending alongside the reach-bar and provided with a horizontally-bent extremity or rear end 8, carrying a brake-shoe 9, provided with a facing of rubber or other suitable material and arranged to bear upon the tire of the rear wheel 5. The upper end of the brake-lever is provided with a laterally-projecting heel-rest 10, arranged in close proximity to the foot-rest 11 on the front fork and provided with an upturned extremity 12, adapted to bear against the side of the heel of the shoe of the rider, and thus confine the heel in position.

The numerals 13 14 designate clamps engaging the reach and serving to hold the brake-lever in operative position. The clamp 13 consists of two hinged sections $13^a$ $13^b$, curved at their upper end to take about the reach-bar 4 and provided with arms or extremities $13^c$ $13^d$, projecting at an angle toward one side of the reach-bar, as shown. The arm $13^c$ is provided with a tongue 14, adapted to fit within a slot or recess 15 in the arm $13^b$. A screw 16 passes through said arms, and a nut 17 screws thereon and is adapted to hold the clamping-sections close about the reach-bar. The brake-lever is fulcrumed to the screw 16, as shown.

The clamp 14 is constructed substantially like the pivot-clamp 13, being provided with two hinged sections $14^a$ $14^b$, having arms or extremities $14^c$ $14^d$, which are somewhat longer than the said arms or extremities of the pivot-clamp and serve as guides between which the brake-lever is adapted to move. The arm $14^c$ is provided with a slot or recess 21, adapted to receive a tongue 18 on the opposing arm. These two arms are clamped about the reach by a screw and nut 19, which have position above the brake-lever, so that the said lever is adapted to move between the two arms to an extent limited only by the tongue-and-slot connection, which serves as the bottom or base plate therefor. A plate-spring 20 is secured at one end to the brake-lever and has its opposite end resting upon the said base-plate of the guide-clamp and normally serves to press the free or operative end of the lever upward, so as to throw the brake-shoe 9 out of contact with the tire of the rear wheel, as will be readily understood.

The construction and location of the brake mechanism just described provides improved means whereby the rider may check or stop the bicycle conveniently when riding by simply removing his foot from the pedals and when coasting without removing his foot from the coasters 11. This insures that during coasting the bicycle will be under the complete control of the rider, who will not have to remove his feet from the coasters in order to apply the brake, as is necessary with foot-brakes of ordinary construction.

My invention provides a simple and effective brake which may be readily applied to and removed from the bicycle-frame, is simple in construction, and may be manufactured at a small cost.

Having thus described my invention, what I claim as new, and desire to secure by Letters Patent, is—

In brake mechanism for bicycles, the combination with the bicycle-frame, of a pivot-clamp engaging the reach-bar thereof adjoining the crank-hanger; a guide-clamp also engaging the reach-bar at a point adjoining the front fork thereof and provided with guide-arms, a brake-lever fulcrumed to the said pivot-clamp and moving between the guide-arms of the guide-clamp and provided at one end with a heel-rest having position adjoining the front fork of the bicycle and at the other end thereof with a horizontal extremity provided with a brake-shoe adapted to bear against the rear-wheel tire, and a spring connecting between the guide-clamp and the brake-lever and serving normally to press the upper or operative end of the lever upward and thereby throw the brake-shoe out of engagement with rear-wheel tire, substantially as described.

In testimony whereof I have signed this specification in the presence of two subscribing witnesses.

PETER KREBS.

Witnesses:
 THOS. POWELL,
 T. M. JONES.